Oct. 20, 1959        M. TURCHAN        2,909,103
TRACER SUPPORT FOR MACHINE TOOL
Filed Dec. 17, 1958
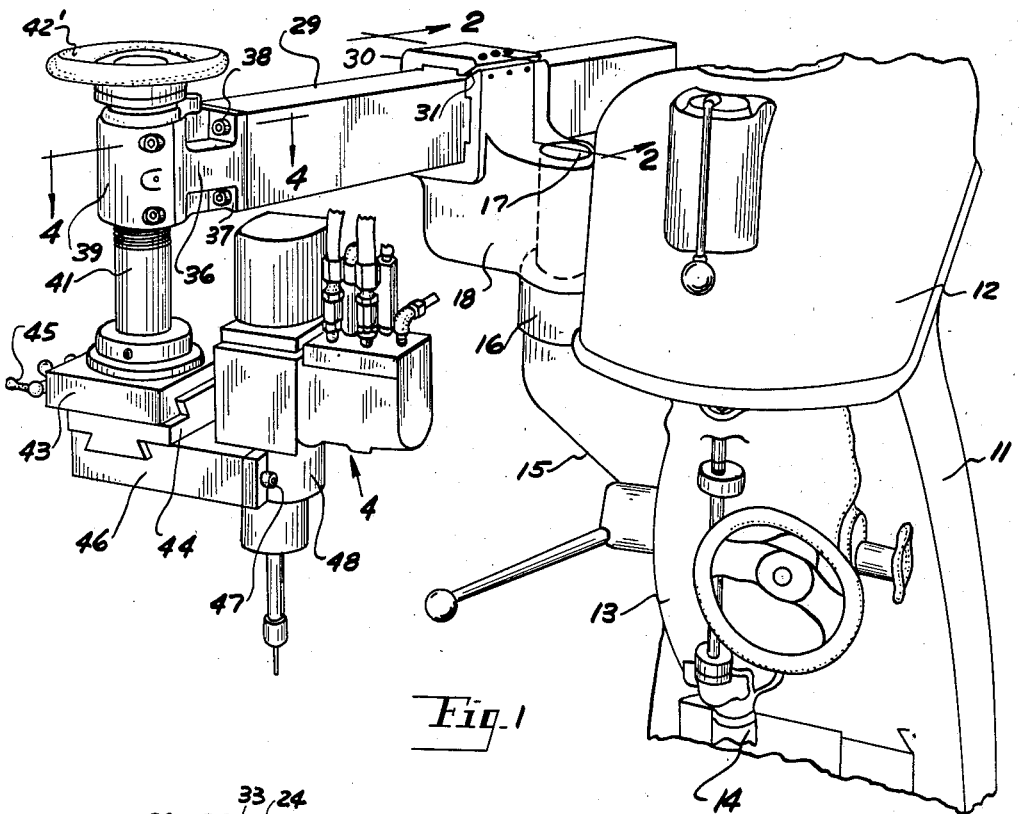
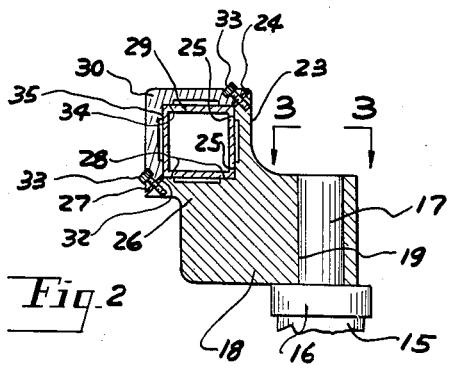
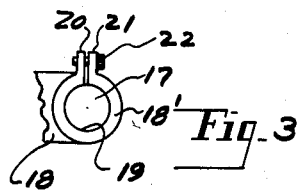
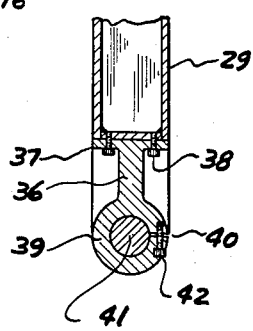
INVENTOR.
MANUEL TURCHAN
BY
*Robert A. Sloman*
ATTORNEY United States Patent Office 2,909,103
Patented Oct. 20, 1959

2,909,103

TRACER SUPPORT FOR MACHINE TOOL

Manuel Turchan, Dearborn, Mich.

Application December 17, 1958, Serial No. 781,000

4 Claims. (Cl. 90—62)

This invention relates to tracer controlled machine tools, and more particularly to a tracer mounting therefor.

Heretofore, employing suitable brackets, a tracer support tube was used, from the forward end of which tracer mounting means were secured.

The tracer and its associated controls and connections are normally displaced laterally from the vertical axis of the tracer support with the result that when the bracket supporting the mounting tube was loosened to permit adjustments thereof, the weight of the tracer assembly caused the tracer mounting and the connected tube to partly rotate on its longitudinal axis within its support. This necessitated the time consuming operation of re-aligning the tracer so that its longitudinal axis was again perfectly vertical.

It is the object of the present invention to employ a novel tracer mounting for a machine tool wherein this objectionable rotation of the tracer mounting is positively prevented, and wherein the tracer mounting beam may be adjusted on loosening of its supporting bracket and at the same time said support beam will be restrained against rotary movement.

This and other objects will be seen from the following specification and claims in conjunction with the appended drawing in which:

Fig. 1 is a fragmentary perspective view of a machine tool and the present tracer mounting therefor.

Fig. 2 is a fragmentary section taken on line 2—2 of Fig. 1.

Fig. 3 is a fragmentary section taken on line 3—3 of Fig. 2.

Fig. 4 is a fragmentary section taken on line 4—4 of Fig. 1.

It will be understood that the above drawing illustrates merely a preferred embodiment of the invention and that other embodiments are contemplated within the scope of the claims hereafter set forth.

Referring to the drawing, one illustrative form of machine tool, such as a milling machine, is shown in Fig. 1. Said machine includes upright column 11 carrying overhanging head 12 with depending spindle mounting assembly 13, including cutting tool supporting spindle 14, fragmentarily shown.

Lateral bracket 15 is suitably secured to one side of column 11 as by shoulder bolts or otherwise and includes at its upper end the annular enlarged body 16 from which upwardly projects the upright cylindrical pivot 17.

Mounting bracket 18, as shown in Figs. 1, 2 and 3 includes the upright bore 19 which cooperatively receives pivot 17. Said bracket has end portion 18' adjustably flexible with respect to the body of bracket 18 and terminates in the outwardly extending ear 21 parallel to ear 20 on body 18.

Locking screws 22 extend through ear 21 and threadedly engage ear 20 for adjustably securing mounting bracket 18 upon and with respect to cylindrical pivot 17.

Referring to Fig. 2, said mounting bracket includes upstanding support plate 23 downwardly and inwardly tapered at 24 along its top edge and including a pair of spaced vertically aligned inwardly projected flat bearing surfaces 25 for supportably engaging one side edge of mounting arm 29, which is square in cross section.

Mounting bracket 18 also includes lateral support plate 26 whose outer longitudinal edge is tapered at 27. Support plate 26 includes the parallel spaced upwardly projecting flat bearing surfaces 28 adapted to supportably engage the bottom wall of tracer mounting arm 29.

Right angular clamping plate 30 is positioned over the upper and outer edge portions of support arm 29 and is fixedly secured to portions of right angularly related support plates 23—26 by a series of socketed headed screws 33 for fixedly retaining support 29 therebetween.

The upper portion of clamp 30 is tapered at one edge 31 along its undersurface for cooperative registry with tapered surface 24. Said clamp along its bottom edge has an additional tapered surface 32 cooperatively registering with tapered surface 27 of support plate 26.

The undersurface of clamp 30 has a pair of parallel spaced downwardly extending flat bearing surfaces 34 cooperatively engaging top portions of tracer mounting arm 29. The upright interior wall of clamp 30 includes the pair of spaced inwardly extending flat bearing surfaces 35 cooperatively engaging upright edge portions of mounting arm 29 completing the assembly and securing of said arm within and upon mounting bracket 18.

Bracket 36 includes upright support plate 37 secured at 38 upon the forward upright end of arm 29. Said bracket terminates in the upright cylindrical sleeve 39 vertically slit at 40, Fig. 4 to supportably and slidably mount the upright screw 41. Suitable socketed headed screws 42 upon sleeve 39 adjustably secure its outer flexible wall to the body of bracket 36.

Handwheel 42', in a conventional manner, is rotatively journaled and restrained upon sleeve 39 against vertical movement and threadedly engages screw 41. Thus rotary movements of handwheel effect conventional non-rotative vertical adjustment of screw 41.

Mounting plate 43 upon the lower end of screw 41 has an undercut dovetail slot therein supportably mounting longitudinally adjustable support 44. Support 44 has a depending dovetail for adjustably engaging transverse tracer support 46.

Suitable handwheels and screw means 45 are employed for effecting manual adjustments at right angles to each other of supports 44—46 in a conventional manner forming no part of the present invention. Upright formed mounting bracket 48 is secured at 47 upon one end support 46 fixedly securing upright tracer assembly 49 therebetween.

The structure of the tracer and the associated control mechanism and fluid connections form no part of the present invention and accordingly their description is omitted.

It is pointed out, however, that the tracer and associated parts has considerable weight so as to normally exert a bending moment with respect to upright support screw 41, which is laterally displaced from the longitudinal axis of the tracer.

Heretofore in a tracer mounting of this type the tracer support arm, instead of being square as in Fig. 1 at 29, was cylindrical. Accordingly, each time the clamp 30 or equivalent structure was released to permit in or out adjustment of said support arm, the above mentioned bending moment caused a partial rotary movement of the support arm on its longitudinal axis.

By employing the present tracer support arm 29 of square cross section, even if the clamp 30 is loosened, it is positively assured there will be no rotary movement of said support arm, thus overcoming the long existing difficulties where the cylindrical type of support arm was employed.

Having described my invention, reference should now be had to the following claims.

I claim:

1. In a tracer support, a mounting bracket adapted for securing at one end to a machine tool, transversely elongated right angularly related support plates upon the top of its other end, an elongated horizontally disposed tracer mounting arm of square cross section supported intermediate its ends on and at one side bearing against said support plates respectively, a right angular clamping plate extending over and engaging the top and other side of said arm and secured at its opposite ends to corresponding outer ends of said support plates, gripping said arm therebetween, said arm on loosening of said clamping plate adapted for slidable adjustment transversely of said bracket and clamping plate, a horizontally disposed tracer support plate arranged below and transversely of one end of said arm, universally adjustable means interconnecting one end of said plate with said end of said arm, and a tracer assembly with a vertical axis mounted upon the other end of said plate, said axis being laterally displaced from said arm, said mounting bracket support plates and clamping plate retainingly engaging said tracer mounting arm against angular displacement transversely of its longitudinal axis.

2. In the tracer support of claim 1, the meeting edges of said support plates and clamping plate being tapered and in cooperating engaging relation, the securing of said clamping plate consisting of a series of headed screws extending through the opposite ends of said clamping plate at right angles to said tapered edges and in tight threaded engagement within the respective outer ends of said support plates.

3. In the tracer support of claim 1, said support plates and the right angular sides of said clamping plate each having a pair of spaced flattened elongated inwardly projecting surfaces supportably engaging the respective sides of said tracer mounting arm.

4. In the tracer support of claim 1, the securing of said mounting bracket to said machine tool, including a bracket adapted for securing at one end to said machine tool, a horizontally disposed support surface at its other end, an upright cylindrical pivot extending upwardly from said support surface, an upright split sleeve on one end of said mounting bracket rotatively mounted on said pivot, and screw means on said sleeve adjustably securing the same to said pivot.

References Cited in the file of this patent

UNITED STATES PATENTS

| 2,490,128 | Henkes et al. | Dec. 6, 1949 |
| 2,669,161 | Frampton | Feb. 16, 1954 |

FOREIGN PATENTS

| 757,140 | Great Britain | Sept. 12, 1956 |